(12) United States Patent
Nagaoka et al.

(10) Patent No.: US 10,452,051 B2
(45) Date of Patent: Oct. 22, 2019

(54) NUMERICAL CONTROL DEVICE (71) Applicant: Mitsubishi Electric Corporation, Tokyo (JP)

(72) Inventors: Kotaro Nagaoka, Tokyo (JP); Hiroki Uemura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/327,860

(22) PCT Filed: Oct. 4, 2016

(86) PCT No.: PCT/JP2016/079423
§ 371 (c)(1),
(2) Date: Feb. 25, 2019

(87) PCT Pub. No.: WO2018/066048
PCT Pub. Date: Apr. 12, 2018

(65) Prior Publication Data
US 2019/0196440 A1 Jun. 27, 2019

(51) Int. Cl.
*G05B 19/402* (2006.01)
*G05B 19/404* (2006.01)
*H02P 29/00* (2016.01)

(52) U.S. Cl.
CPC ......... *G05B 19/402* (2013.01); *G05B 19/404* (2013.01); *H02P 29/00* (2013.01)

(58) Field of Classification Search
None
See application file for complete search history.

(56) References Cited

U.S. PATENT DOCUMENTS

| 5,892,680 A * | 4/1999 | Kita ..................... G05B 19/404 219/69.17 |
| 9,018,886 B2 | 4/2015 | Iwashita et al. |
| 2014/0167672 A1* | 6/2014 | Tezuka ................. G05B 19/404 318/632 |
| 2015/0309500 A1* | 10/2015 | Hashimoto ............ G05B 19/19 318/630 |

(Continued)

FOREIGN PATENT DOCUMENTS

| CN | 103792888 A | 5/2014 |
| JP | 2013-191186 A | 9/2013 |

(Continued)

OTHER PUBLICATIONS

Decision to Grant a Patent for Japanese Patent Application No. 2017-537514 dated Aug. 15, 2017, 6 pages including English Translation.

(Continued)

*Primary Examiner* — Ryan A Jarrett
(74) *Attorney, Agent, or Firm* — Xsensus LLP (57) ABSTRACT

A numerical control device that controls a servomotor on the basis of a machining program. The machining program determines whether or not to perform correction on reversal of a moving direction of a mechanical system driven in a movement axis direction by the servomotor. This is done on the basis of the machining program including an instruction that causes the reversal of the moving direction of the mechanical system and another instruction to be executed later than the instruction.

5 Claims, 4 Drawing Sheets

(56) References Cited

U.S. PATENT DOCUMENTS

| | | | | |
|---|---|---|---|---|
| 2015/0323924 A1* | 11/2015 | Nagaoka | ............. | G05B 19/404 |
| | | | | 700/275 |
| 2015/0355607 A1* | 12/2015 | Nagaoka | ................ | G05B 19/19 |
| | | | | 318/561 |
| 2017/0185064 A1* | 6/2017 | Masumiya | ............. | G05B 19/27 |

FOREIGN PATENT DOCUMENTS

| | | |
|---|---|---|
| JP | 2014-54001 A | 3/2014 |
| JP | 2014-191520 A | 10/2014 |

OTHER PUBLICATIONS

International Search Report dated Dec. 20, 2016 for PCT/JP2016/079423 filed on Oct. 4, 2019, 8 pages including English Translation.

\* cited by examiner

```
(1ST LINE)G90
(2ND LINE)G0X0.Y0.
(3RD LINE)G1F1000
(4TH LINE)X10.
(5TH LINE)Y10.
(6TH LINE)X-10.    (← X AXIS DIRECTION REVERSAL)
(7TH LINE)Y0.
(8TH LINE)X0.      (← X AXIS DIRECTION REVERSAL)
```

(1ST LINE)G90
(2ND LINE)G0X0.Y0.Z0.
(3RD LINE)G1F1000
(4TH LINE)X5.Y0.
(5TH LINE)X10.Y0.
(6TH LINE)Y1.Z1.
(7TH LINE)X5.Y1.
(8TH LINE)X0.Y1.
(9TH LINE)Y2.Z2.
(10TH LINE)X5.Y2.001
(11TH LINE)X10.Y2.    (← Y AXIS DIRECTION REVERSAL)
(12TH LINE)Y3.Z3.    (← Y AXIS DIRECTION REVERSAL)
(13TH LINE)X5.Y3.
(14TH LINE)X0.Y3.
(15TH LINE)Y4.Z4.
(16TH LINE)X5.Y4.
(17TH LINE)X10.Y4.

FIG.8

NUMERICAL CONTROL DEVICE

CROSS-REFERENCE TO RELATED APPLICATIONS

The present application is based on PCT filing PCT/JP2016/079423, filed Oct. 4, 2016, the entire contents of which are being incorporated herein by reference.

FIELD

The present invention relates to a numerical control device that controls industrial machinery such as machine tools.

BACKGROUND

In machines for industrial use typified by machine tools, drive control is performed so that tools or tables follow command values. In particular, control for driving a machine so that the tool position relative to a workpiece that is an object to be machined, to accurately follow a commanded trajectory, which is a path of a tool specified by a command, is called trajectory control or contour motion control. The control is performed precisely using a numerical control device and a servo control device attached thereto. A machine to be controlled has a plurality of movement axes, and is driven by the servo control device in directions along the movement axes.

The numerical control device performs position control in the movement axis directions of the machine by using the servo control device. Feedback control is basically performed so that a feedback position detected by a motor end encoder or a linear scale for measuring the position of a tool end follows a command position. However, because error factors such as backlash and lost motion are present in a mechanical system between the feedback position and the tool end position, the tool end position has error with respect to the feedback position due to the influence of the error factors. Backlash refers to clearances of ball screws or the like. Lost motion refers to elastic deformation of ball screws caused by friction on guiding surfaces. The presence of the error of the tool end position with respect to the feedback position means that error occurs at the tool end position when feedback control alone is performed.

In particular, at reversal of the direction along a movement axis of a feed shaft, the movement trajectory of the tool posit iron is significantly affected by backlash or lost motion. A typical example is stepped trajectory error caused at a boundary of quadrants of an arc trajectory when an instruction of an arc trajectory is made. This is because the trajectory is deviated in the negative direction during movement in the positive direct iron and the trajectory is deviated in the positive direction during movement in the negative direction by the influence of the backlash or the lost motion of the mechanical system. Occurrence of such error in following a trajectory causes a line or a scratch on a machined surface, which is not desired.

To reduce the influence of such error factors as backlash and lost motion present in a mechanical system, the numerical control device therefore has a function of predicting error of a trajectory caused by the error factors of the mechanical system and correcting the predicted error in addition to the feedback control. In particular, so-called backlash compensation in which a correction value is added to a command position is performed when the direction of the command position is reversed, that is, when the posve/negative sign of the speed is inverted, in order to reduce the influence of backlash and lost motion (refer to Patent Literature 1, for example).

CITATION LIST

Patent Literature

Patent Literature 1: Japanese Patent Application Laid-open No. 2014-54001

SUMMARY

Technical Problem

The method of applying a backlash correction amount to a command position to correct following error of a tool end caused by backlash or lost motion when the moving direction of a feed shaft is reduced as in the technology taught in Patent Literature 1, however, is a method of applying a correction amount at reversal of the moving direction of the command position. Accordingly, correction is made even on a minute reversal of direction. As a result, the precision may be degraded instead of being improved. Specifically, in a case where a minute movement command is inserted at a connection of an arc and a line owing to computation error in computer-aided manufacturing (CAM), and minute reversal equal to or smaller than a backlash width occurs, unnecessary backlash compensation is performed at an exit of the arc. Furthermore, in a case where a minute reversal block is present in one of adjacent paths and no minute reversal block is present in the other of the adjacent paths, correction is performed or not depending on the paths, which causes a machining scratch. A dead zone may be provided to avoid unnecessary backlash compensation; in this case, however, the timing of correction in such a case as an arc command shape where correction should have been performed is delayed.

The present invention has been made in view of the above, and an object thereof is to provide a numerical control device capable of avoiding unnecessary backlash compensation.

Solution to Problem

The present invention controls a servomotor according to a machining program. An aspect of the present invention determines whether or not to perform correction on reversal of a moving direction of a mechanical system driven in a movement axis direction by the servomotor on the basis of the machining program including an instruction to cause the reversal of the moving direction of the mechanical system and another instruction to be executed later than the instruction.

ADVANTAGEOUS EFFECTS OF INVENTION

A numerical control device according to the present invention achieves an effect of avoiding unnecessary backlash compensation.

DESCRIPTION OF EMBODIMENTS

A numerical control device according to an embodiment of the present invention will be described in detail below with reference to the drawings. Note that the present invention is not limited to the embodiment.

First Embodiment

Figure 1:
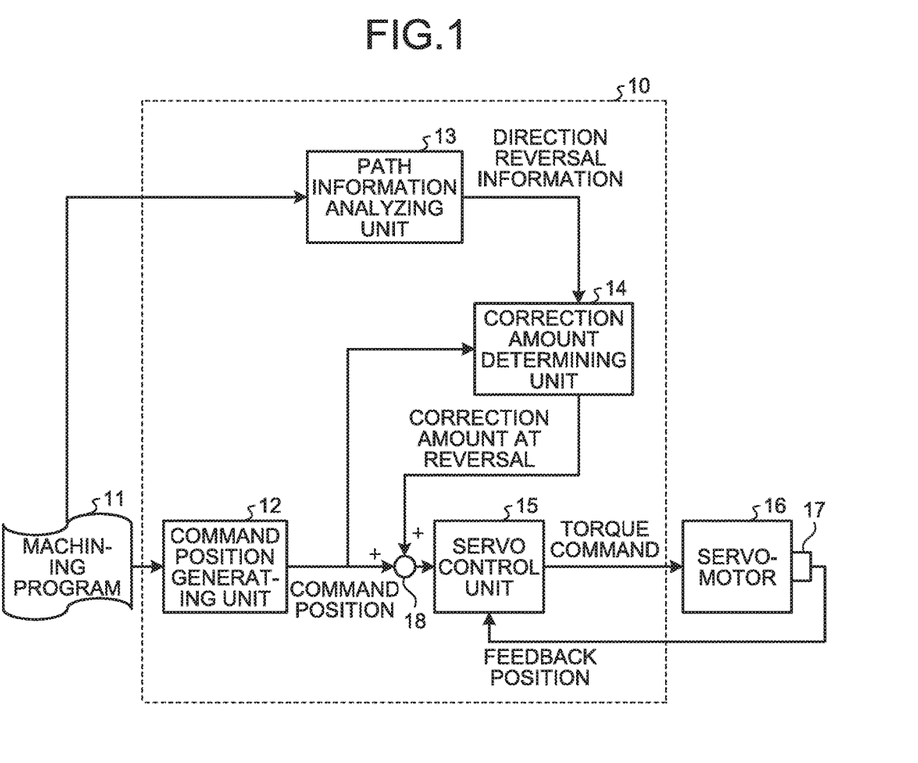
FIG. 1 is a block diagram illustrating a configuration of a numerical control device according to a first embodiment of the present invention.
Figure 2:
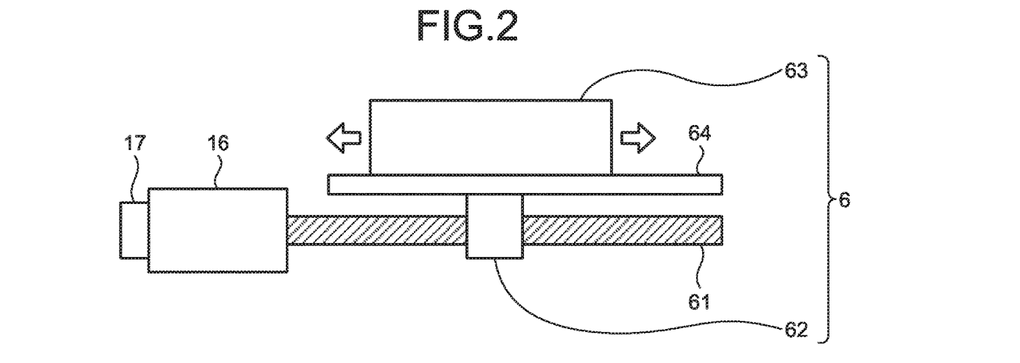
FIG. 2 is a diagram illustrating structures of a servomotor and a mechanical system to be controlled by the numerical control device according to the first embodiment.

FIG. 1 is a block diagram illustrating a configuration of a numerical control device 10 according to a first embodiment of the present invention. FIG. 2 is a diagram illustrating structures of a servomotor 16 and a mechanical system 6 to be controlled by the numerical control device 10 according to the first embodiment. The mechanical system 6 is a general term for parts such as a machine tool, which are movable in movement axis directions in industrial machinery such as a machine tool. Thus, a movement axis indicates a direction along which the mechanical system 6 can move. The structures in FIG. 2 are provided on each movement axis, and the numerical control device 10 controls one or more mechanical systems 6 associated with one or more movement axes.

As illustrated in FIG. 1, the numerical control device 10 controls the servomotor 16 on the basis of an input machining program 11. The machining program 11 includes path information, which is information on a path of movement of a tool necessary for machining, described in instructions using so-called G codes. G codes are also called EIA (Electronic Industries Association; USA) codes. The machining program 11 is described in text data, in which one line basically corresponds to one instruction.

As illustrated in FIG. 2, a position detector 17 is mounted on the servomotor 16, to detect the position of the servomotor 16. A rotary encoder or the like is typically used as the position detector 17. The mechanical system 6 is connected with the servomotor 16 via a ball screw 61, and the servomotor 16 rotates the ball screw 61. Note that the mechanical system 6 includes a nut 62 for converting the rotation of the ball screw 61 into linear motion in the movement axis direction, and a table 63 fixed to the nut 62. A linear guide 64 supports the table 63, and restricts the direction of movement of the table 63 to the direction of the movement axis. The servomotor 16 is thus capable of driving the mechanical system 6 along the movement axis.

Note that the motor position detected directly by the position detector 17 is a value of the rotation angle of the servomotor 16. Thus, the angle value that is the motor position, can be converted into a length in the moving direction of the table 63 by multiplying the angle value by a ball screw's lead, which is a distance the table 63 moves per one turn of the servomotor 16, and dividing the resulting product by the angle $2\pi$ (rad) of one turn of the servomotor 16. Hereinafter, a value obtained by the conversion to the length of in the moving direction of the table 63 will be used as the motor position.

The numerical control device 10 includes a command position generating unit 12 that calculates a command position on the basis of the path information indicated by instructions described in a machining program 11, a path information analyzing unit 13 that analyzes the path information indicated by the instructions described in the machining program 11, a correction amount determining unit 14 that determines whether or not to correct reversal of the moving direction and determines the correction amount at the reversal, a servo control unit 15 that outputs a torque command, and an adder 18.

The command position generating unit 12 sequentially reads the instructions of the machining program 11 from the top thereof, sequentially processes the path information indicated by the instructions described in the machining program 11 from the beginning to perform interpolation and computation of acceleration/deceleration, and calculates and outputs a command position in each control period. Because the instructions described in the machining program 11 are executed in a preset order, path information indicated by another instruction described in the machining program 11 is to be processed temporally later than path information indicated by an instruction executed before the instruction.

The path information analyzing unit 13 analyzes the path information indicated by the instructions described in the machining program 11, extracts description of an instruction that causes reversal of the moving direction, which is reversal of the direction along the movement axis of the movement of the mechanical system 6, in the machining program 11, and generates and outputs direction-reversal-information.

Figure 3:
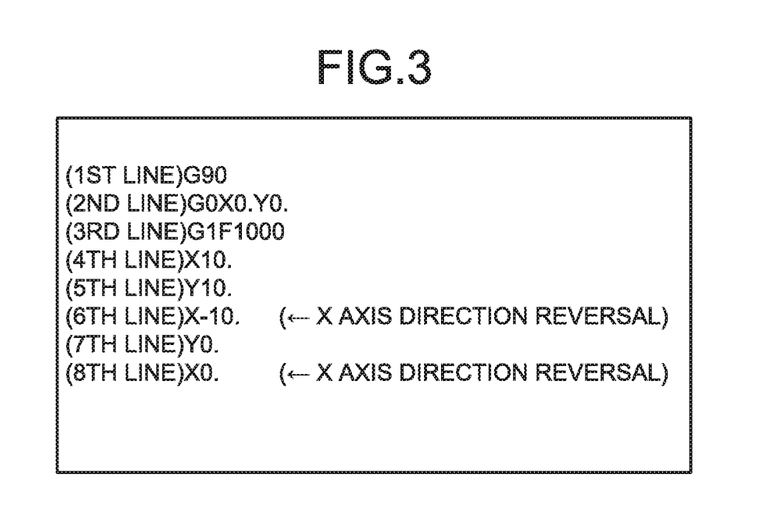
FIG. 3 is a diagram illustrating an example of a machining program according to the first embodiment.

FIG. 3 is a diagram illustrating an example of the machining program 11 according to the first embodiment. The machining program 11 is a machining program for a machine having two movement axes, which are an X axis and a Y axis. The unit of position coordinate indicated by the instructions is "mm". The instructions on the first to third lines of the machining program 11 do not indicate a position coordinate, and explanation thereof is thus omitted. The instruction "G0X0.Y0." on the second line instructs positioning at a point (0,0), that is the origin. Hereinafter, points are similarly expressed in the form of (X-axis coordinate, Y-axis coordinate). The instruction "X10." on the fourth line is an instruction to move to a position at an X-axis coordinate of 10.0 mm without changing the Y-axis coordinate. Thus, the instruction on the fourth line is an instruction to move to the point (10,0). The instruction "Y10." on the fifth line is an instruction to move to a position at a Y-axis coordinate of 10.0 mm without changing the X-axis coordinate. Thus, the instruction on the fifth line is an instruction to move to the point (10,10). Similarly, the machining program 11 provides subsequent instructions to move to the point (−10,10) indicated by the instruction on the sixth line, the point (−10,0) indicated by the instruction on the seventh line, and the point (0,0) indicated by the instruction on the eighth line in this order. Thus, the instructions on the sixth and eighth lines are instructions indicating reversal of the moving direction along the X axis.

Figure 4:
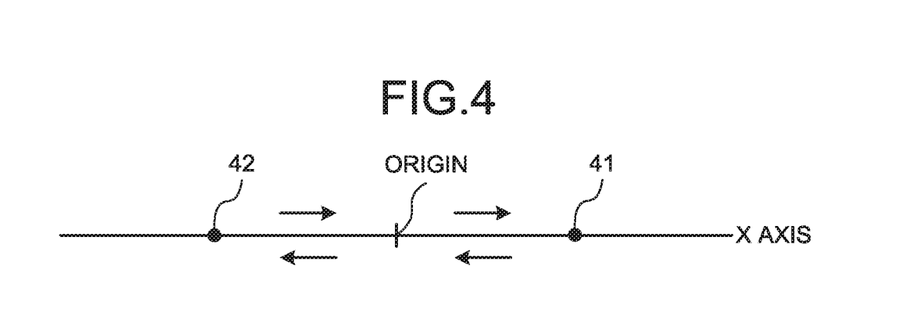
FIG. 4 is a diagram explaining reversal of moving direction along one movement axis according to the first embodiment.

FIG. 4 is a diagram explaining reversal of the moving direction along one movement axis according to the first embodiment. FIG. 4 illustrates reversal of the moving direction along the X axis, which is one of the movement axes, in the machining program 11 illustrated in FIG. 3. The moving direction is reversed in such a manner that the movement in the positive direction is reversed to the movement in the negative direction at a point 41 on the X axis, and the movement in the negative direction is reversed to the movement in the positive direction at a point 12. When it is assumed that FIG. 2 illustrates the mechanical system 6 whose movement axis is the X axis, the reversal of the moving direction of the mechanical system 6 occurs at the points 41 and 42 in FIG. 4.

Thus, the direction-reversal-information generated by the path information analyzing unit 13 at least includes information on description part of an instruction that causes the reversal of the moving direction of the mechanical system 6 in the machining program 11. A specific example of the information on description part of an instruction that causes the reversal of the moving direction of the mechanical system 6 in the machining program 11 is such information as what number line from the top line the instruction that causes the reversal of the moving direction of the mechanical system 6 is described in the machining program 11.

The example of the machining program 11 illustrated in FIG. 3 is described as follows. Upon receiving an instruction indicating a position coordinate for the first time, the path information analyzing unit 13 obtains the coordinate of a destination indicated by the instruction and holds the obtained coordinate in a storage area. Upon receiving an instruction indicating position coordinate for the second time, the path information analyzing unit 13 then obtains the coordinate of a destination indicated by the instruction, holds the obtained coordinate in a storage area, and obtains information corresponding to a movement vector starting from the coordinate of the destination indicated by the first instruction. The path information analyzing unit 13 obtains a sign of the moving direction on each axis on the basis of the movement vector, and holds the obtained sign in the storage area. Note that no sign is obtained and is thus not held for an axis where the movement amount is 0. Upon receiving an instruction indicating position coordinate for the third time, the path information analyzing unit 13 then obtains the coordinate of a destination indicated by the instruction, holds the obtained coordinate in the storage area, and obtains information corresponding to a movement vector starting from the coordinate of the destination indicated by the second instruction. The path information analyzing unit 13 obtains a sign of the moving direction on each axis on the basis of the movement vector, and holds the obtained sign in the storage area. Note that no sign is obtained and is thus not held for an axis where the movement amount is 0. The path information analyzing unit 13 subsequently repeats this process. As a result, because the sign of the moving direction when the last movement amount that is not 0 for each axis is held in the storage area, the path information analyzing unit 13 can determine occurrence of reversal of the moving direction when the sign is inverted by a new instruction.

In the example of the machining program 11 illustrated in FIG. 3, "+", which is the sign for the X axis obtained by the path information analyzing unit 13 according to the instruction "X10." on the fourth line, is inverted to the sign "−" for the X axis obtained according to the instruction "X−10." on the sixth line. The path information analyzing unit 13 can thus determine that reversal of the moving direction is to be caused at the point 41 in FIG. 4 by the instruction "X−10." on the sixth line. In addition, the sign "−" for the X axis obtained by the path information analyzing unit 13 according to the instruction "X−10." on the sixth line, is inverted to the sign "+" for the X axis obtained according to the instruction "X0." on the eighth line. The path information analyzing unit 13 can thus determine that reversal of the moving direction is to be caused at the point 42 in FIG. 4 by the instruction "X0." on the eighth line. Thus, the direction-reversal-information on the X axis generated by the path information analyzing unit 13 includes "sixth line" and "eighth line", which are the line numbers of the instructions that cause reversal of the moving direction on the X axis in the machining program 11.

Furthermore, because the path information analyzing unit 13 pre-reads the machining program 11, preceding the command position generating unit 12, the path information analyzing unit 13 can include path information into the direction-reversal-information. The path information is indicated by an instruction to be executed later than the instruction that causes reversal of the moving direction of the mechanical system 6 in the machining program 11. Pre-reading of the machining program 11 by the path information analyzing unit 13, preceding the command position generating unit 12 means that the path information analyzing unit 13 reads an instruction to be executed later than another instruction, the another instruction indicating path information used by the command position generating unit 12 to calculate a command position. The path information analyzing unit 13 provides the correction amount determining unit 14 with the generated direction-reversal-information. The correction amount determining unit 14 is capable of determining whether or not to perform backlash compensation at the position of reversal of the moving direction on the movement path on the basis of the direction-reversal-information generated from the instruction in the machining program 11 pre-read by the path information analyzing unit 13.

The path information analyzing unit 13 obtains the amount of movement of the mechanical system 6 from the position of reversal of the moving direction along the movement axis, where the reversal of the moving direction has occurred, in a predetermined section of the movement path following the position of the reversal of the moving direction by performing the pre-reading. The path information analyzing unit 13 may include the obtained movement amount of the mechanical system 6 into the direction-reversal-information and provide the correction amount determining unit 11 with the direction-reversal-information. A specific example of the movement amount along the movement axis is a movement amount along the movement axis on which reversal of the moving direction of the table 63 has occurred.

In the example of the machining program 11 illustrated in FIG. 3, the mechanical system 6 moves from a point (10,10) to a point (−10, 10) according to the instruction "X−10." on the sixth line. That is, the mechanical system 6 moves 20 mm in the X-axis direction from the point (10, 10), which is the position of reversal of the moving direction. Thus, the direction-reversal-information may include "20 mm", which is the movement amount from the position of reversal in the moving direction in addition to "sixth line" that relates to the position of the reversal in the moving direction. In addition, the mechanical system 6 moves from a point (−10,0) to a point (0,0) according to the instruction "X0." on the eighth line. That is, the mechanical system 6 moves 10 mm in the X-axis direction from the point (−10,0), which is the position of reversal of the moving direction. Thus, the direction-reversal-information may include "10 mm", which is the movement amount from the position of reversal in the moving direction in addition to "eighth line" that relates to the position of the reversal in the moving direction.

The path information analyzing unit 13 obtains the coordinate values on the movement axis of the mechanical system 6 at the position of reversal of the moving direction by performing the pre-reading. The path information analyzing unit 13 may further include the coordinate values on the movement axis of the mechanical system 6 at the position of reversal of the moving direction into the direction-reversal-information, and provide the correction amount determining unit 14 with the direction-reversal-information. Specific coordinate values on the movement axis of the mechanical system 6 are such coordinate values in the moving direction corresponding to the movement axis of the table 63. In a case where a plurality of movement axes of the mechanical system 6 are present, the coordinate values on the movement axes of the mechanical system 6 at the position of reversal of the moving direction include coordinate values on all of the movement axes at the position of reversal of the moving direction.

In the example of the machining program 11 illustrated in FIG. 3, the coordinate values of the position of reversal of the moving direction according to the instruction "X−10." on the sixth line are (10,10) as described above. Thus, the direction-reversal-information including "sixth line" may include (10,10) as the coordinate values of the position of reversal of the moving direction. In addition, the coordinate values of the position of reversal of the moving direction according to the instruction "X0." on the eighth line are (−10,0) as described above. Thus, the direction-reversal-information including "eighth line" may include (−10,0) as the coordinate values of the position of reversal of the moving direction.

The correction amount determining unit 14 determines a correction amount at reversal, which is the amount of correction of reversal in the moving direction, on the basis of the direction-reversal-information and a command position. Specifically, it is determined whether or not to set the correction amount at reversal to 0. When the correction amount at reversal is not set to 0, that is, when backlash compensation is to be performed, the correction amount at reversal is set to a value other than 0.

The correction amount at reversal in the case where the correction amount determining unit 14 outputs a correction amount at reversal of a value other than 0 and performs backlash compensation, is preset as a parameter for the backlash compensation. Specifically, a value that has the same sign as that in the moving direction after reversal of the moving direction along the movement axis of the mechanical system 6 where the reversal of the moving direction has occurred, and has a magnitude corresponding to a backlash amount specific to the mechanical system 6 on the movement axis where reversal of the moving direction has occurred, is set as the correction amount at reversal.

At the adder 18, the command position and the correction amount at reversal are added, and the value resulting from the addition of the command position and the correction amount at reversal is input as a corrected command position to the servo control unit 15. In other words, the command position corrected by the correction amount at reversal is input to the servo control unit 15.

The corrected command position is input to the servo control unit 15, and a motor position, that is, the rotation angle of the servomotor 16 detected by the position detector 17 is also input as a feedback position to the servo control unit 15. The servo control unit 15 then performs servo control so that the feedback position follows the corrected command position. Specifically, motor torque resulting from computation using the feedback position and the corrected command position performed by the servo control unit 15 is output as a torque command, and the servomotor 16 is driven according to the torque command.

Figure 5:
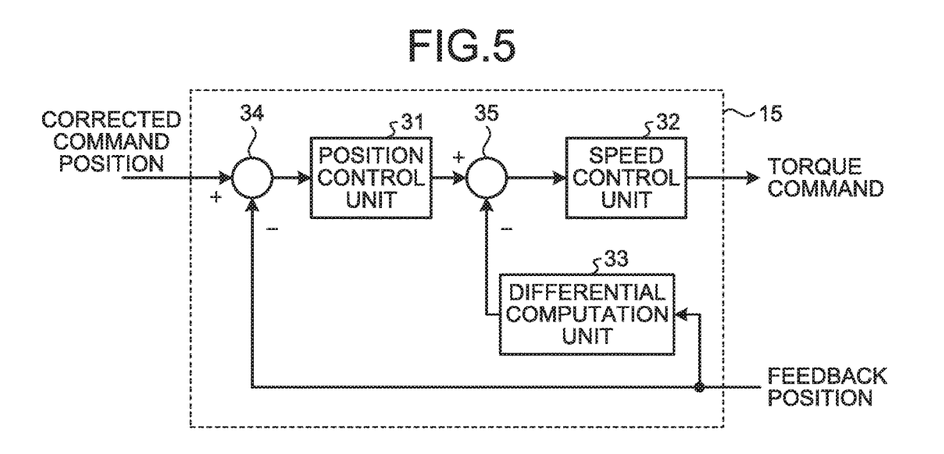
FIG. 5 is a block diagram illustrating a configuration of a servo control unit according to the first embodiment.

FIG. 5 is a block diagram illustrating a configuration of the servo control unit 15 according to the first embodiment.

The servo control unit 15 includes a position control unit 31 that performs a position control process, a speed control unit 32 that performs a speed control process, a differential computation unit 33 that performs differential computation, and subtractors 34 and 35.

The subtractor 34 obtains the difference between the corrected command position and the feedback position as a position deviation, which is input to the position control unit 31. The position control unit 31 performs the position control process such as proportional control on the position deviation to compute a command speed, and outputs the command speed.

The differential computation unit 33 differentiates the feedback position, and outputs a derivative. Note that the differentiation process is performed by a differential process in a discrete time system. Specifically, a value resulting from dividing a difference between a current feedback position and a feedback position at one sample before, by a control processing period is obtained as an approximate derivative, and output from the differential computation unit 33.

The subtractor 35 obtains the difference between the command speed output by the position control unit 31 and the derivative output by the differential computation unit 33, and inputs the obtained difference to the speed control unit 32.

The speed control unit 32 performs the speed control process such as proportional integral control on the output from the subtractor 35 to obtain a torque command, and outputs the torque command.

Typically, the machining program 11 is generated from a computer-aided design (CAD) shape by using a CAM. The CAM replaces shape information expressed by the CAD with point group data, connects the points by paths such as scanning lines and contour lines to generate path information for machining, and outputs the path information described in a form of G codes as the machining program 11. In a case where the original CAD shape is a free-form surface shape, the output machining program 11 is constituted by connection of minute line segments. Such a machining program 11 is called a minute segment program. In a case where the machining program 11 is a minute segment program, such a pattern as moving in one direction of the movement axis, then slightly reversing to stop may be included in the machining program 11. In addition, in a case where scanning line machining is performed by a minute segment program, reversal of the moving direction of the mechanical system 6 may occur only in a certain movement path among a plurality of parallel movement paths but reversal of the moving direction of the mechanical system 6 may not occur in the others of the parallel movement paths in scanning line machining.

Figure 6:
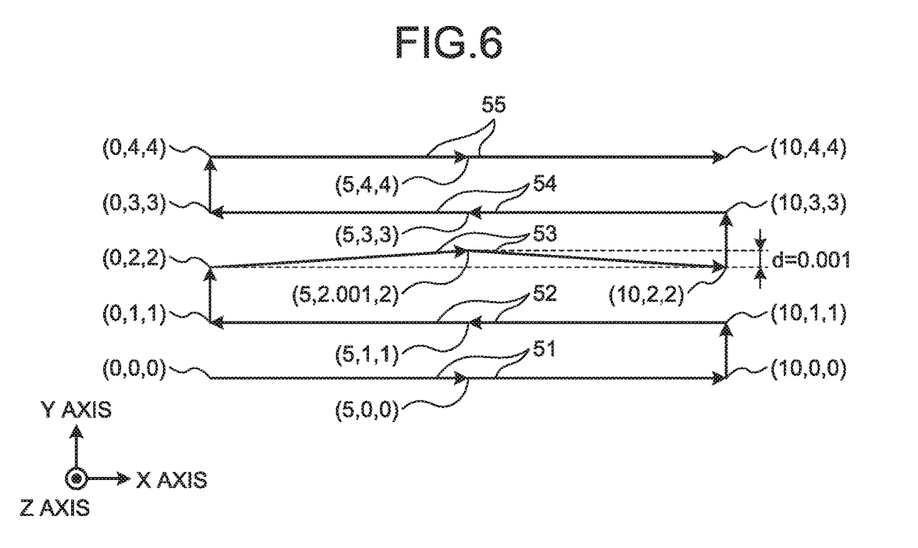
FIG. 6 is a diagram illustrating a plurality of parallel scanning line movement paths in scanning line machining according to the first embodiment.
Figure 7:
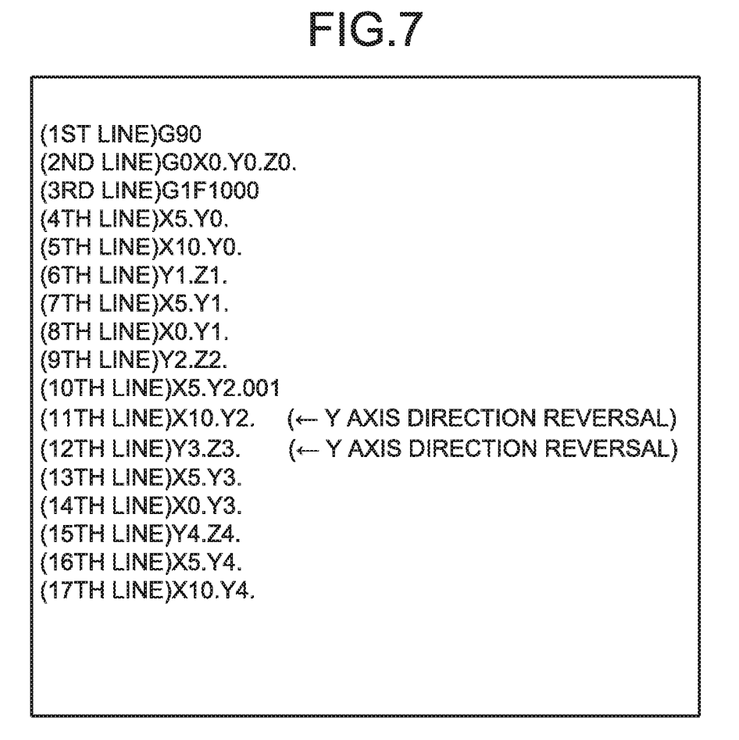
FIG. 7 is a diagram illustrating an example of a machining program for performing the scanning line machining according to the first embodiment.

FIG. 6 is a diagram illustrating a plurality of parallel scanning line movement paths in scanning line machining according to the first embodiment. FIG. 7 is a diagram illustrating an example of the machining program 11 for performing the scanning line machining according to the first embodiment. FIG. 6 is a diagram of projection of a movement path, which is constituted by connection of a plurality of parallel scanning line movement paths 51, 52, 53, 54, and 55, onto an X-Y axis plane in a machine having three movement axes, which are an X axis, a Y axis, and a Z axis, perpendicular to one another. The direction. perpendicular to the sheet surface of FIG. 6 corresponds to the Z axis. FIG. 7 illustrates the machining program 11 instructing to perform the scanning line machining illustrated in FIG. 6 in the machine having three movement axes of the X axis, the Y axis, and the Z axis. The unit of position coordinates indicated by instructions in the machining program 11 of FIG. 7 is "mm". Note that the instructions on the first to third lines of the machining program 11 of FIG. 7 do not indicate position coordinates.

The machining program 11 of FIG. 7 includes instructions indicating movement to each of points expressed by (X-axis coordinate, Y-axis coordinate, Z-axis coordinate) in FIG. 6. Specifically, the machining program 11 of FIG. 7 indicates sequential movement starting from (0,0,0) that is a point indicated by a positioning instruction on the second line to a point (5, 0, 0) indicated by an instruction on the fourth line, a point (10,0,0) indicated by an instruction on the fifth line, a point (10,1,1) indicated by an instruction on the sixth line, a point (5,1,1) indicated by an instruction on the seventh line, a point (0,1,1) indicated by an instruction on the eighth line, a point (0,2,2) indicated by an instruction on the ninth line, a point (5,2.001,2) indicated by an instruction on the tenth line, a point (10,2,2) indicated by an instruction on the eleventh line, a point (10,3,3) indicated by an instruction on the twelfth line, a point (5,3,3) indicated by an instruction on the thirteenth line, a point (0,3,3) indicated by an instruction on the fourteenth line, a point (0,4,4) indicated by an instruction on the fifteenth line, a point (5,4,4) indicated by an instruction on the sixteenth line, and a point (10,4,4) indicated by an instruction on the seventeenth line, in this order.

The instructions for the scanning line movement path 53 are those on the tenth line and the eleventh line of the machining program 11 of FIG. 7, where reversal in the moving direction on the Y axis occurs by the instruction "X10.Y2." on the eleventh line. Specifically, the coordinate values at the position of reversal of the moving direction according to the instruction on the eleventh line are (5,2.001, 2). Furthermore, because the amount of movement of the mechanical system 6 in the Y-axis direction according to the instruction on the eleventh line, which is the movement from the point (5,2.001,2) to the point (10,2,2), is d=0.001 mm.

In addition, reversal in the moving direction on the Y axis also occurs according to the instruction "Y3.Z3." on the twelfth line. The coordinate values at the position of reversal of the moving direction according to the instruction on the twelfth line are (10,2,2). Furthermore, because the amount of movement of the mechanical system 6 in the Y-axis direction according to the instruction on the twelfth line, which is the movement from the point (10,2,2) to the point (10,3,3), is 1 mm.

In the CAM, such a movement path where reversal of the moving direction by a minute distance occurs owing to computation error even though reversal of the moving direction does not occur in an original CAD shape may be included in the machining program 11. Such reversal of the moving direction may occur because of the computation error of the CAM on a movement path at a joint of faces of a CAD shape where the faces should have been linearly connected.

As specifically illustrated in FIG. 6, on the scanning line movement path 53, two minute line segments are slightly bent at the connection of the line segments because of computation error of the CAM, and reversal of the moving direction of the mechanical system 6 occurs on the Y axis, which is the movement axis in the vertical direction of the drawing, at the connection point (5,2.001,2) being the movement reversal position. On the scanning line movement paths 51, 52, 54, and 55, which are the other movement paths parallel to the scanning line movement path 53, however, the movement paths are formed by line segments that are not bent and reversal in the moving direction of the mechanical system. 6 does not occur on the Y axis.

In addition, in a case where the movement amount from the occurrence of the reversal of the moving direction until the movement in the reversed direction stops is smaller than the backlash amount specific to the mechanical system 6, backlash compensation corresponding to the backlash amount at the reversal of the moving direction will results in backlash compensation on a position where backlash compensation is not actually necessary, which causes a line on a machined surface. Thus, in the case of the movement path as illustrated in FIG. 6, backlash compensation in the Y-axis direction at the position of reversal of the moving direction on the scanning line movement path 53 where the reversal of the moving direction occurs, will results in backlash compensation of the scanning line movement path 53 only. In this case, a scratch occurs on the machined surface at the position of the backlash compensation performed on the scanning line movement path 53.

The correction amount determining unit 14 therefore determines whether or not to perform backlash compensation from broad view of movement paths, and does not perform backlash compensation at the position of reversal of the moving direction on the movement path where backlash compensation is determined to be unnecessary. For the determination, the path information analyzing unit 13 reads the machining program 11, obtains the direction-reversal-information, and outputs the obtained direction-reversal-information, preceding the reading the path information from the machining program 11 by the command position generating unit 12. Determination on whether or not to perform backlash compensation from broad view of movement paths means that the correction amount determining unit 14 determines whether or not to perform backlash compensation on the basis of the direction-reversal-information obtained by the path information analyzing unit 13 by pre-reading the machining program 11, preceding the command position generating unit 12.

In the numerical control device 10 according to the first embodiment, the path information analyzing unit 13 pre-reads the machining program 11 prior to the command position generating unit 12, obtains a certain amount of direction-reversal-information, and outputs the obtained direction-reversal-information, before the command position generating unit 12 reads the machining program 11 and outputs command positions. Specifically, the correction amount determining unit 14 determines whether or not to perform backlash compensation on the command positions output from the command postion generating unit 12, which has sequentially read the path information from the beginning of the machining program 11, on the basis of the direction-reversal-information from the path information analyzing unit 13, which has pre-read the machining program 11. Note that the amount of the machining program 11 to be read by the path information analyzing unit 13 prior to the command position generating unit 12, is set in advance as a parameter of the number of lines or the number of characters of the machining program 11. A specific example of a parameter set in advance includes: the number of lines of the machining program 11 to be pre-read by the path information analyzing unit 13 is a value of 1000 lines, and the number of characters of the machining program 11 to be pre-read is a value of 10000 characters.

The correction amount determining unit 14 only needs to determine whether or not to perform backlash compensation on the command position output from the command position generating unit 12, which has read the path information described in the machining program 11. The determination is made on the basis of the direction-reversal-information that includes the path information, which is indicated by an instruction to be executed later than the instruction indicating the path information corresponding to the command position in the machining program 11. Thus, pre-reading of the machining program 11 by the path information analyzing unit 13 prior to the command position generating unit 12 does not necessarily mean reading the machining program 11 earlier in terms of time.

As described above, the direction-reversal-information output by the path information analyzing unit 13 includes information on description part of an instruction that causes reversal of the moving direction of the mechanical system 6 in the machining program 11. This enables the correction amount determining unit 14 in receipt of the direction-reversal-information to determine whether or not the command position currently output by the command position generating unit 12 is a command position where reversal of the moving direction occurs, by using the information on the description part of the instruction that causes reversal of the moving direction of the mechanical system 6 in the machining program 11. Furthermore, the direction-reversal-information also includes path information indicated by an instruction to be executed later than an instruction that causes reversal of the moving direction of the mechanical system 6 in the machining program 11. This enables the correction amount determining unit 14 to determine whether or not backlash compensation needs to be performed on the command position associated with the instruction of the machining program 11 that is currently processed by the command position generating unit 12, by using the path information indicated by the instruction to be executed later than the instruction that causes the reversal in the moving direction of the mechanical system 6 in the machining program 11. As a result, unnecessary backlash compensation can be avoided, and appropriate backlash compensation can be performed regardless of a command shape indicated by a command position.

In a case where the direction-reversal information includes the movement amount of the mechanical system 6 along the movement axis on which reversal of the moving direction in a predetermined section of a movement path following the position of reversal of the moving direction, and when the command position currently output by the command position generating unit 12 is a command position where reversal of the moving direction occurs, the correction amount determining unit 14 can obtain how long the mechanical system 6 moves along the movement axis on which reversal in the moving direction has occurred after the reversal in the moving direction. In order that the direction-reversal-information includes the movement amount of the mechanical system 6 along the movement axis on which reversal of the moving direction in a predetermined section following the position of reversal of the moving direction, the path information analyzing unit 13 needs to obtain the movement amount and include the obtained movement amount into the direction-reversal-information on the basis of the path information indicated by the instruction to be executed later than the instruction indicating the path information corresponding to the command position on which reversal of the moving direction occurs currently output by the command position generating unit 12 in the machining program 11. When the movement amount is larger than a predetermined movement amount threshold, the correction amount determining unit 14 then outputs a correction amount at reversal and performs backlash compensation. In contrast, when the movement amount of the mechanical system 6 is smaller than the movement amount threshold, the correction amount determining unit 14 sets the correction amount at reversal to 0 and does not perform backlash compensation because it is deemed that unnecessary reversal of the moving direction is inserted in the movement path by the CAM. The movement amount threshold is set in advance as a parameter. The movement amount threshold is set to a value of a magnitude corresponding to the backlash amount specific to the mechanical system 6 on the movement axis on which reversal of the moving direction has occurred.

In a case where the direction-reversal information includes coordinate values on the movement axis of the mechanical system 6 at the position of reversal of the moving direction, and when the command position currently output by the command position generating unit 12 is a command position where reversal of the moving direction of the mechanical system 6 occurs, the correction amount determining unit 14 can determine whether or not another position of reversal of the moving direction is present within a predetermined distance from the coordinate values on the movement axis of the mechanical system 6 at the position where the reversal of the moving direction occurs. Note that, for the determination by the correction amount determining unit 14, the path information analyzing unit 13 needs to obtain information on whether or not another position of reversal of the moving direction is present within the predetermined distance from the coordinate values of the mechanical system 6 at the position where the reversal of the moving direction occurs, and include the obtained information into the direction-reversal-information. The path information analyzing unit 13 obtains the information on the basis of: the path information indicated by an instruction to be executed after, and the path information indicated by another instruction to be executed before, the other instruction indicating the path information corresponding to the command position currently output by the command position generating unit 12 in the machining program 11. Thus, the predetermined distance needs to be a distance included within the range of the movement path indicated by the path information pre-read from the machining program 11 by the path information analyzing unit 13. In a case where another position of reversal of the moving direction is present within the predetermined distance from the coordinate values of the mechanical system 6 at the position where the reversal of the moving direction occurs, the correction amount determining unit 14 outputs a correction amount at reversal and performs backlash compensation. In contrast, when no other position of reversal of the moving direction is present within the predetermined distance from the coordinate values of the mechanical system 6 at the position where the reversal of the moving direction occurs, the correction amount determining unit 14 sets the correction amount at reversal to 0 and does not perform backlash compensation. The predetermined distance is set in advance as a parameter. The predetermined distance may be set to a pick feed, which is an interval of parallel movement paths in scanning line machining indicated by the machining program 11. In addition, the process performed by the correction amount determining unit 14 based on the coordinate values of the mechanical system 6 on the movement axis, may be used with the process based on the movement amount of the mechanical system 6 along the movement axis where reversal of the moving direction has occurred, which is described earlier.

As described above, in the machining program 11 of FIG. 7, the instructions on the eleventh and twelfth lines are instructions indicating reversal of the moving direction along the Y axis. The path information analyzing unit 13 therefore generates the following two sets of information as the direction-reversal-information for the Y axis.

Description of the instruction that causes reversal in the moving direction: eleventh line;

movement amount from the position of reversal of the moving direction: 0.001 mm (=d); and     coordinate values at the position of reversal of the moving direction: (5,2.001,2).

Description of the instruction that causes reversal in the moving direction: twelfth line;

movement amount from the position of reversal of the moving direction: 1 mm; and     coordinate values at the position of reversal of the moving direction: (10,2,2).

Assume here that the aforementioned movement amount threshold is 5 µm (=0.005 mm), and the predetermined distance for determining whether or not another position of reversal of the moving direction is present near the position of reversal of the moving direction is 1.5 mm.

Regarding the position of reversal of the moving direction on the eleventh line of the machining program 11 described in FIG. 7, the movement amount d from the position of reversal of the moving direction is smaller than 5 µm, which is the movement amount threshold. Furthermore, (10,2,2), which is the coordinate of the position of reversal of the moving direction on the twelfth line, is distant from (5,2.001,2), which is a coordinate of the position of reversal of the moving direction on the eleventh line, by more than 1.5 mm that is the predetermined distance.

Thus, the correction amount determining unit 14 determines not to perform backlash compensation and determines the correction amount at reversal to be 0 on the basis of the fact that the movement amount d is smaller than the movement amount threshold and that the distance between the coordinate of the positions of reversal of the moving direction is larger than the predetermined distance. This eliminates unnecessary backlash compensation at the point (5,2.001,2), which is the position where minute line segments of the scanning line movement path 53 FIG. 6 are bent, and prevents occurrence of a scratch on the machined surface. Note that the correction amount determining unit 14 may determine not to perform backlash compensation on the basis of either of the fact that the movement amount d is smaller than the movement amount threshold or the fact that the distance between coordinates of the positions of reversal of the moving direction is larger than the predetermined distance.

Figure 8:
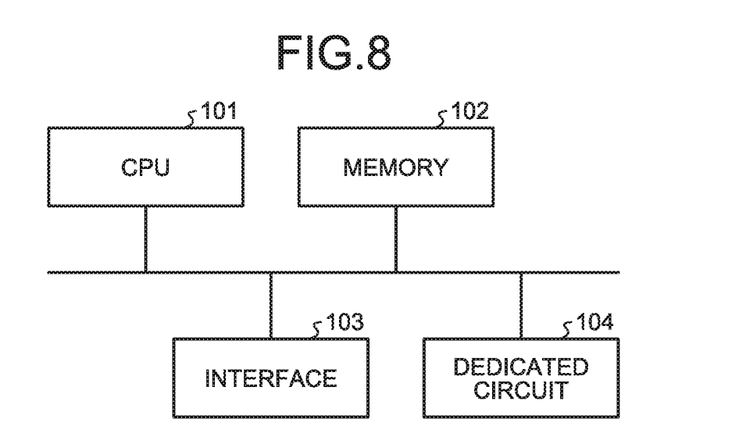
FIG. 8 is a diagram illustrating a configuration for implementing functions of the numerical control device according to the first embodiment by a computer.

FIG. 8 is a diagram illustrating a configuration for implementing the functions of the numerical control device 10 according to the first embodiment by a computer. In this case, the functions of the numerical control device 10 are implemented by a central processing unit (CPU) 101, a memory 102, an interface 103, and a dedicated circuit 104. The functions of the command position generating unit 12, the path information analyzing unit 13, the correction amount determining unit 14, and the adder 18 are implemented by software, firmware, or a combination of software and firmware. The software or firmware is described in the form of programs and stored in the memory 102. The CPU 101 implements the functions of the components by reading and executing the programs stored in the memory 102. Thus, the numerical control device 10 includes the memory 102 for storing programs, which, when the functions are executed by the computer, results in execution of steps of performing the operations of the command position generating unit 12, the path information analyzing unit 13, the correction amount determining unit 14, and the adder 18. In other words, these programs cause a computer to execute the procedures or methods of the command position generating unit 12, the path information analyzing unit 13, the correction amount determining unit 14, and the adder 18. Note that the memory 102 also serves as the above-described storage area used by the path information analyzing unit 13, and a specific example thereof is a random access memory (RAM). The interface 103 has a function of receiving the machining programs 11. A specific example of the dedicated circuit 104 is an inverter circuit of the servo control unit 15.

Alternatively, part of the functions of the command position generating unit 12, the path information analyzing unit 13, the correction amount determining unit 14, the servo control unit 15, and the adder 18 may be implemented by dedicated hardware, and others may be implemented by software or firmware. As described above, the numerical control device 10 is capable of implementing the above-described functions by hardware, software, firmware, or combination thereof.

As described above, with the numerical control device 10 according to the first embodiment, the path information analyzing unit 13 pre-reads the machining program 11 prior to the command position generating unit 12, which allows generation of the direction-reversal-information by the path information analyzing unit 13 to be performed prior to the command position computation by the command position generating unit 12. As a result, the correction amount determining unit 14 is capable of making global determination on the basis of the direction-reversal-information, and make accurate determination on whether or not to perform backlash compensation.

In addition, with the numerical control device 10 according to the first embodiment, because the correction amount determining unit 14 sets the correction amount at reversal to 0 and does not output the correction amount at reversal when the movement amount of the mechanical system 6 after reversal of the moving direction is smaller than the movement amount threshold. Therefore, unnecessary backlash compensation is not performed in such a case where the movement amount of the mechanical system 6 after reversal of the moving direction is equal to or smaller than the backlash amount.

Furthermore, with the numerical control device 10 according to the first embodiment, because the correction amount determining unit 14 sets the correction amount at reversal to 0 and does not output the correction amount at reversal when no other position of reversal of the moving direction is present near the current position of reversal of the moving direction. Therefore, unnecessary backlash compensation is not performed in a case where the position of reversal of the moving direction occurs only on a specific movement path in scanning line machining against machining as intended.

As described above, in the numerical control device 10 according to the first embodiment, the correction amount determining unit 14 determines whether or not to perform backlash compensation on the basis of the direction-reversal-information generated by the path information analyzing unit 13, which pre-reads the machining program 11 prior to the command position generating unit 12. This avoids performing unnecessary backlash compensation in a case where minute reversal against intended machining occurs owing to such a cause as computation error caused by the CAM. As a result, it is possible to avoid degradation in the precision of the contour motion control due to unnecessary backlash. compensation, which prevents occurrence of a line or a scratch on a machined surface.

The configurations presented in the embodiment above are examples of the present invention, and can be combined with other known technologies or can be partly omitted or modified without departing from the scope of the present invention.

REFERENCE SIGNS LIST 6 mechanical system; 10 numerical control device; 11 machining program; 12 command position generating unit; 13 path information analyzing unit; 14 correction amount determining unit; 15 servo control unit; 16 servomotor; 17 position detector; 31 position control unit; 32 speed control unit; 33 differential computation unit; 41, 42 point; 51, 52, 53, 54, 55 scanning line movement path; 61 ball screw; 62 nut; 63 table; 64 linear guide; 101 CPU; 102 memory; 103 interface; 104 dedicated circuit.

The invention claimed is:

1. A numerical control device to control a servomotor on the basis of a machining program, comprising:
a processor; and
a memory to store a program which, when executed by the processor, performs steps of:
determining whether or not to perform correction on reversal in a moving direction of a mechanical system driven in a movement axis direction by the servomotor on the basis of an instruction that causes the reversal in the moving direction of the mechanical system and another instruction obtained by pre-reading the machining program and executed later than the instruction that causes the reversal in the moving direction.

2. The numerical control device according to claim 1, wherein the processor performs
generating a command position on the basis of path information described in the machining program;
generating direction-reversal-information that includes information on description part of the instruction in the machining program and path information indicated by the instruction obtained by pre-reading the machining program and executed later than the instruction that causes the reversal in the moving direction, on the basis of the path information; and
determining whether or not to perform the correction on the basis of the command position and the direction-reversal-information, and
the numerical control device further comprises a servo circuit to perform servo control so that a motor position of the servomotor follows the command position corrected by the correction.

3. A numerical control device to control a servomotor on the basis of a machining program, comprising:
a processor; and
a memory to store a program which, when executed by the processor, performs steps of:
generating a command position on the basis of path information described in the machining program;
generating direction-reversal-information that includes:
information on description part in the machining program of an instruction that causes reversal in a moving direction of a mechanical system driven in a direction of a movement axis by the servomotor,
path information indicated by an instruction to be executed later than the instruction that causes the reversal of the moving direction, and
a movement amount of the mechanical system along the movement axis, on which the reversal of the moving direction occurs, in a predetermined section of a movement path following a position where the reversal of the moving direction occurs, on the basis of the path information;
determining whether or not to perform correction on the reversal of the moving direction on the basis of the command position and the direction-reversal-information, and setting a correction amount at reversal to zero when the movement amount is smaller than a predetermined movement amount threshold, the correction amount at reversal being an amount of the correction, and
a servo circuit to perform servo control so that a motor position of the servomotor follows the command position corrected by the correction.

4. The numerical control device according to claim 2, wherein
the direction-reversal-information includes a coordinate value on the movement axis of the mechanical system at a position where the reversal of the moving direction occurs, and
the processor sets a correction amount at reversal to zero when no other reversal of the moving direction occurs within a predetermined distance from the coordinate value, the correction amount at reversal being an amount of the correction.

5. A numerical control device to control a servomotor on the basis of a machining program, comprising:
a processor; and
a memory to store a program which, when executed by the processor, performs steps of:
generating a command position on the basis of path information described in the machining program;
generating, on the basis of the path information, direction-reversal-information including information on description part in the machining program of an instruction that causes reversal of a moving direction of a mechanical system driven in a direction of a movement axis by the servomotor, path information indicated by an instruction to be executed later than the instruction that causes the reversal of the moving direction, and a coordinate value on the movement axis of the mechanical system at a position where the reversal of the moving direction occurs;
determining whether or not to perform correction on the reversal of the moving direction on the basis of the command position and the direction-reversal-information, and setting a correction amount at reversal to zero when no other reversal of the moving direction occurs within a predetermined distance from the coordinate value, the correction amount at reversal being an amount of the correction, and
a servo circuit to perform servo control so that a motor position of the servomotor follows the command position corrected by the correction.

* * * * *